United States Patent [19]

Moser

[11] Patent Number: 5,067,319
[45] Date of Patent: Nov. 26, 1991

[54] SYSTEM FOR PURIFYING THE EXHAUST GASES OF DIESEL ENGINES

[75] Inventor: Franz Moser, Steyr, Austria

[73] Assignee: Steyr-Daimler-Puch AG, Vienna, Austria

[21] Appl. No.: 479,374

[22] Filed: Feb. 13, 1990

[30] Foreign Application Priority Data

Feb. 15, 1989 [AT] Austria .................. 334/89

[51] Int. Cl.$^5$ .................................. F01N 3/28
[52] U.S. Cl. ........................ 60/288; 60/297; 422/169; 422/171
[58] Field of Search ........... 60/297, 288; 422/169, 422/171, 217, 111, 114

[56] References Cited

U.S. PATENT DOCUMENTS

| | | | |
|---|---|---|---|
| 3,657,892 | 4/1972 | Perga | 422/171 |
| 3,674,441 | 7/1972 | Cole | 60/297 |
| 3,937,015 | 2/1976 | Akado et al. | |
| 4,346,557 | 8/1982 | Shadman et al. | |
| 4,485,621 | 12/1984 | Wong et al. | |
| 4,485,622 | 12/1984 | Takagi et al. | |
| 4,505,106 | 3/1985 | Frankenberg | 60/297 |

FOREIGN PATENT DOCUMENTS

| | | | |
|---|---|---|---|
| 0115722 | 9/1986 | European Pat. Off. | |
| 3532345 | 5/1986 | Fed. Rep. of Germany | |
| 200316 | 9/1986 | Japan | 60/288 |
| 68713 | 3/1988 | Japan | 60/297 |
| 781374 | 11/1980 | U.S.S.R. | 60/297 |

Primary Examiner—Douglas Hart
Attorney, Agent, or Firm—Marmorek, Guttman & Rubenstein

[57] ABSTRACT

A system for purifying the exhaust gases of a diesel engine comprises an exhaust gas line, which is branched to form two branch lines, which are adapted to be shut off in alternation by change-over valve means. One of said branch lines constitutes a filter line, which incorporates a soot filter. The other branch line constitutes a by-pass line. Downstream of the soot filter the filter line joins the by-pass line to form a common end line. In dependence on the load on the engine, the filter line is opened by the change-over valve means only during an operation of the engine under a full load or under a partial load in excess of a predetermined value. In order to ensure that the exhaust gas will almost entirely be purified during an operation of the engine throughout its load range, an diesel soot oxidation-inducing catalyst is provided downstream of the change-over valve means and is incorporated in the by-pass line or in the common end line.

7 Claims, 2 Drawing Sheets

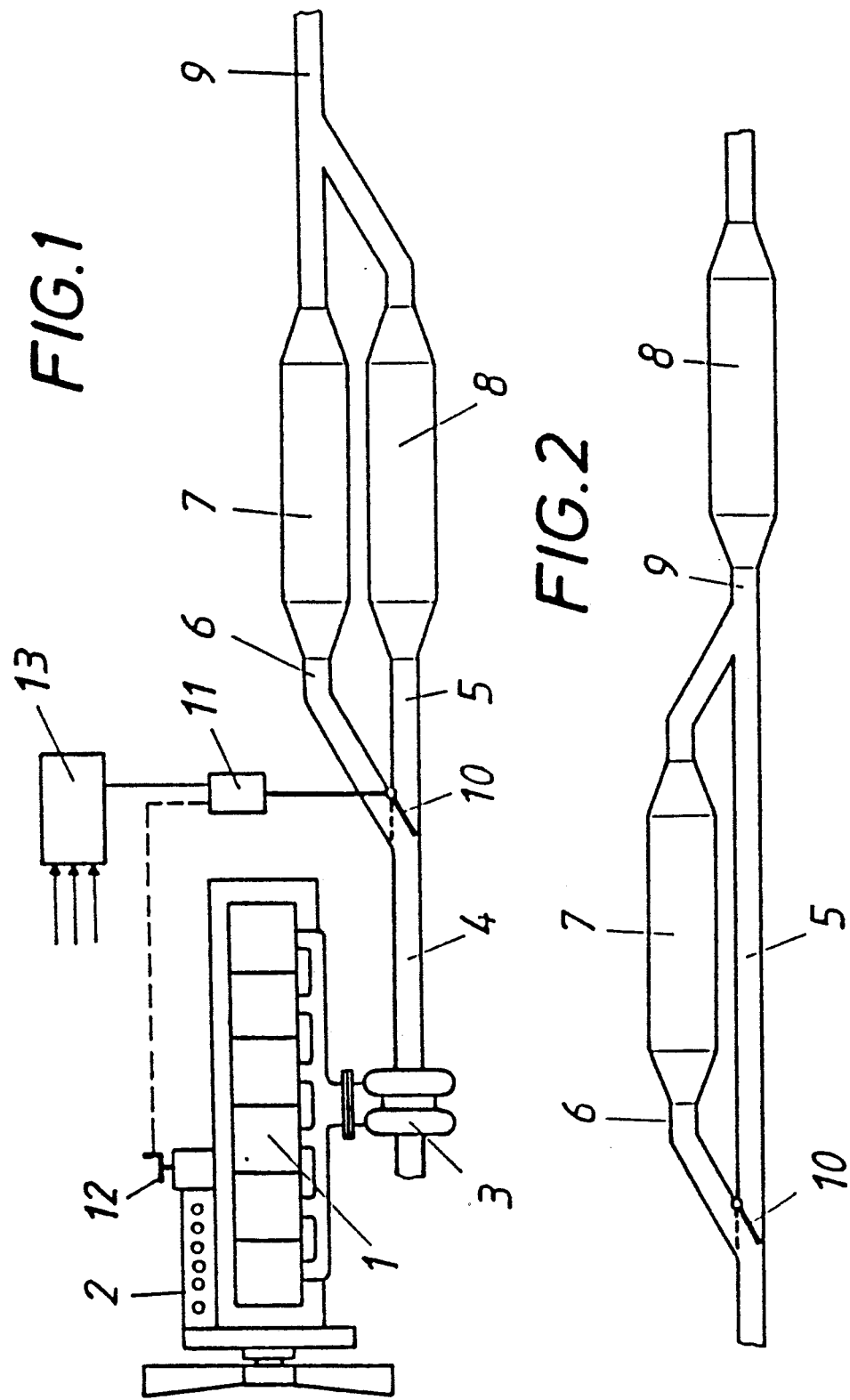

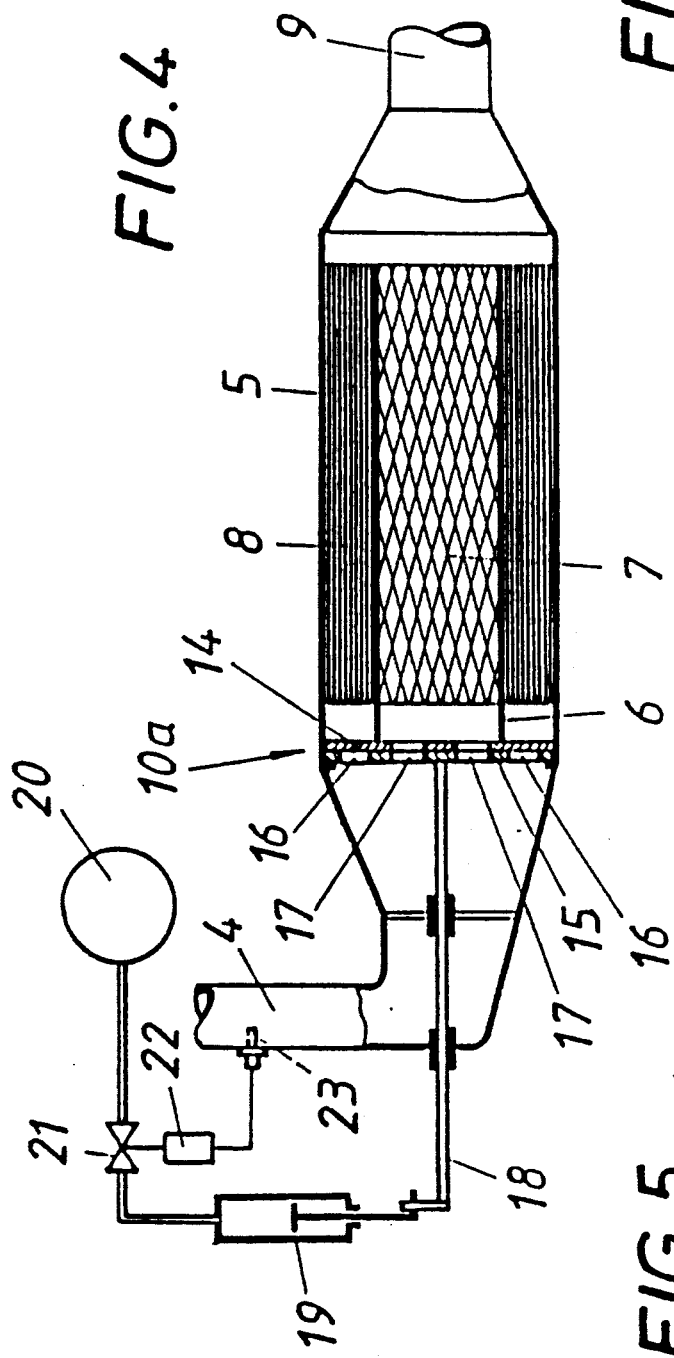
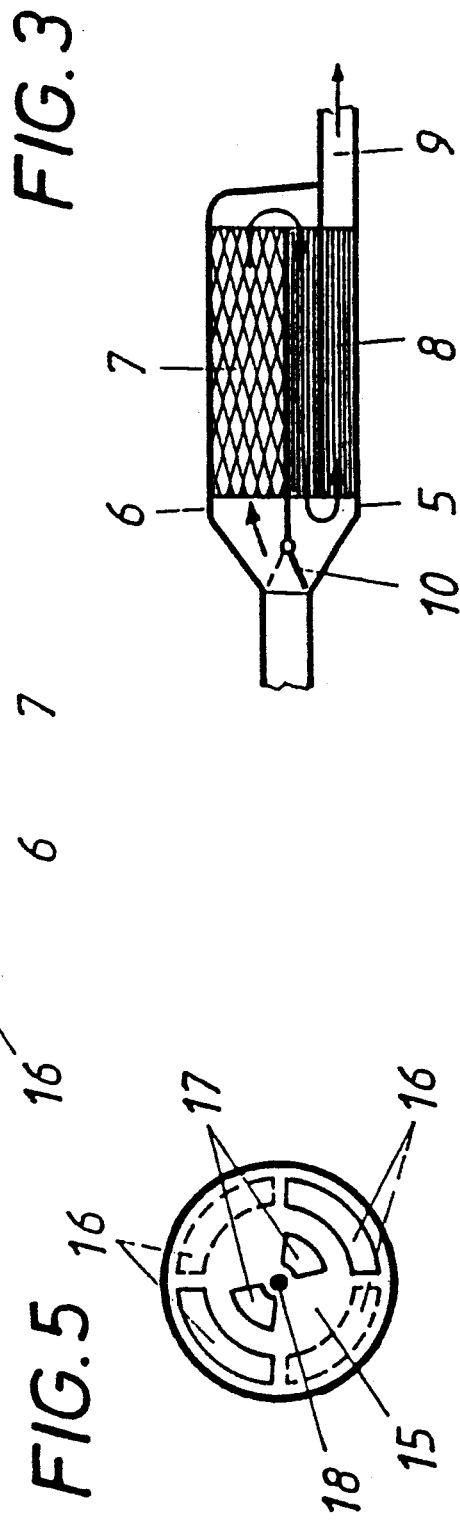

SYSTEM FOR PURIFYING THE EXHAUST GASES OF DIESEL ENGINES

BACKGROUND OF THE INVENTION

1. Field of the Invention

This invention relates to a system for purifying the exhaust gases of diesel engines, comprising an exhaust gas line, which is connected to form two branch lines, which are adapted to be shut off in alternation by change-over valve means and one of which constitutes a filter line, which incorporates a soot filter and downstream of said soot filter is joined to the other branch line, which constitutes a by-pass line, whereby a common end line is formed. Said changeover valve means are operable in dependence on the load on the engine so that only the filter line will be open when the engine is operating under its full load or under a partial load in excess of a predetermined value.

2. Description of the Prior Art

The design of that system is based on the recognition that diesel soot particles are formed in diesel engines mainly during an operation of the engine under full load and in the upper partial load range and that particles which are contained in the exhaust gas during an operation under partial load will mainly consist of incompletely burnt hydrocarbons of the fuel and of the lubricating oil. Because the filter line which is opened only during an operation of the engine under its full load or under a partial load in excess of a predetermined value, the soot filter will not be effective unless the exhaust gas is at a sufficiently high temperature, which is sufficient for a self-regeneration of the soot filter and in that case there will be no need for separate means for igniting the soot which has been collected in the soot filter. But because a major part of the emission of particles will take place during an operation of the engine under a load in that high range, a relatively high proportion of the soot can be removed from the exhaust gas in that case. Tests have shown that 75 to 85 percent of the total amount of particles will be emitted by the engine during an operation in that high load range.

Such a system has already been disclosed in Published German Application 35 32 345 and in U.S. Pat. No. 3,937,015. But it will be understood that the exhaust gas will not be purified at all by that known system during an operation of the engine under relatively low partial loads so that the results are not entirely satisfactory.

It is known from U.S. Pat. No. 4,485,622 that a soot filter can be provided with a coating which ensures that the filter will also be effective as an oxidation-inducing catalyst for diesel soot. But such a filter cannot effect a purification to an optimum degree because owing to the surface coating the filter must have substantial dimensions, which will not be consistent with the requirements for filtration.

SUMMARY OF THE INVENTION

For this reason it is an object of the invention so to improve by relatively simple means the system which has been described first hereinbefore that the exhaust gases will be virtually completely purified.

The object set forth is accomplished in accordance with the invention in that an oxidation-inducing catalyst for diesel soot is provided downstream of the change-over valve means and is incorporated in the by-pass line or in the common end line.

During an operation of the engine under a relatively low partial load the change-over valve means will deliver the exhaust gas stream only to the by-pass line so that the exhaust gas will reliably flow through the oxidation-inducing catalyst. Even at relatively low temperature above about 300° C. that catalyst will be effective to decompose particles which have been formed by an incomplete combustion of the fuel and of the lubricating oil. It may be particularly desirable, of course, to incorporate the oxidation-inducing catalyst in the common end line so that the catalyst will be flown through by the entire exhaust gas. In that case the catalyst will decompose also particles which have been formed by the regeneration of the soot filter so that the exhaust gas discharged by the system will always have a high purity.

It has been found that it is particularly desirable to provide heat-conductive means which interconnect the filter line, which incorporates the soot filter, and the by-pass line, which incorporates the oxidation-inducing catalyst. Such an arrangement will ensure that the purifying device (filter or catalyst) which is not flown through at a time will be maintained at a desirable temperature by heat conducted from the other purifying device which is operated at the same time. Besides, a simple design, which provides for an effective heat transfer, will be obtained if the by-pass line, which incorporates the oxidation-inducing catalyst, and the filter line are coaxially arranged and one of them surrounds the other and the change-over valve means consist of a rotary valve comprising two coaxial discs, each of which has at least one first aperture that registers with the filter line and at least one second aperture that registers with the by-pass line, which incorporates the oxidation-inducing catalyst, and said discs are rotatable relative to each other between two positions, in which said first and second apertures, respectively, of said disks register with each other. During a catalysis effected when the engine is operated under a relatively low partial load the catalyst will generate heat so that heat will be transferred to the soot filter and the latter will thus be maintained at a relatively high temperature and a regeneration of the soot filter will be initiated as soon as a change over to the operation of the soot filter has been effected. On the other hand, the heat which is generated at a high rate by the soot filter during its regeneration will result in a heat transfer to the catalyst so that the latter will subsequently become effective as soon as the load on the engine has been reduced to a relatively low partial load. Because the oxidation-inducing catalyst and the soot filter are coaxially arranged, change-over valve means may be provided which are reliable and inexpensive and do not involve the disadvantages of the conventional dampers and ensure a uniform distribution of the stream of exhaust gas over the area of the oxidation-inducing catalyst or of the soot filter, as the case may be.

BRIEF DESCRIPTION OF THE PREFERRED EMBODIMENTS

FIG. 1 is a top plan view showing a diesel engine provided with a system in accordance with the invention for purifying the exhaust gas.

FIG. 2 shows a modification of the system of FIG. 1.

FIG. 3 is a sectional view showing another arrangement of the filter and catalyst.

FIG. 4 is a simplified sectional view showing a preferred embodiment of the system in accordance with the invention.

FIG. 5 is a transverse sectional view showing the system of FIG. 4 in a view on the change-over valve.

DETAILED DESCRIPTION OF THE PREFERRED EMBODIMENTS

Embodiments of the invention are illustrated in the drawing in simplified views.

A diesel engine 1 is provided with a fuel injection pump 2 and with an exhaust gas-driven turbocharger 3. An exhaust line 4 extending from the turbocharger 3 is branched into first and second branch lines 5 and 6. The branch line 6 constitutes a filter line, which incorporates a soot filter 7. The second branch line 5 constitutes a by-pass line, which incorporates an oxidation-inducing catalyst 8. Downstream of the soot filter 7 and the oxidation-inducing catalyst 8 for diesel soot, respectively, the two branch lines 5 and 6 join to form a common end line 9. A change-over valve as shown in FIGS. 1 to 3 is provided between the exhaust gas line 4 and the two branch lines 5 and 6 and in the embodiments shown in FIGS. 1 to 3 comprises a simple pivoted valve flap 10, which is operable to selectively shut off either the filter line 6 or the by-pass line 5. The change-over valve 10 is actuated by an actuator 11, which may be coupled to a lever 12 for controlling the fuel injection pump 2 or may be controlled by a controller 13 in response to signals which represent parameters reflecting the load under which the engine is operated.

In the embodiment shown in FIG. 2 the oxidation-inducing catalyst 8 is incorporated in the common end line 9 so that the oxidation-inducing catalyst 8 will always be flown through by the exhaust gas regardless of the position of the change-over valve 10.

In the embodiment shown in FIG. 3 the branch lines 5 and 6 and particularly the soot filter 7 and the oxidation-inducing catalyst 8 are arranged close to each other in a housing and are connected to each other by heat-conductive means.

A particularly desirable arrangement is illustrated in FIGS. 4 and 5. In that embodiment the by-pass line 5 and the oxidation-inducing catalyst 8 incorporated therein are annular and coaxially surround the filter line 6 and the soot filter 7 incorporated therein and said parts 5, 6, 7, 8 are interconnected by heat-conductive means. In that embodiment the change-over valve 10a consists of a rotary valve, which comprises two cooperating coaxial apertured disks 14 and 15, which are mounted in a flaring downstream end portion of the exhaust line 4. The downstream apertured disk 14 is stationary. The upstream apertured disk 15 is rotatably mounted. Each of the disks 14 and 15 is formed with first and second sets of apertures 16 and 17. The first apertures 16 of each of the disks 14 and 15 register with the by-pass line 5. The second apertures 17 of each of the disks 14 and 15 registers with the filter line 6, which incorporates the soot filter 7. The rotatable disk 15 can be rotated between two positions, in which either only the first apertures 16 or only the second apertures 17 of both disks register with each other. The disk 15 can be rotated between said two positions by means of a shaft 18 and an actuator, which is constituted by a piston-cylinder unit 19. Pressure fluid is supplied to the piston-cylinder unit 19 from a pressure fluid source 20 under the control of a solenoid valve 21, which is controlled by a controller 22, which is operatively connected to a temperature sensor or thermostat 23 contained in the exhaust gas line 4. FIGS. 4 and 5 show the change-over valve 10a with the disk 15 in that angular position in which the by-pass line 5 incorporating the oxidation-inducing catalyst 8 is shut off and the exhaust gas flows through the filter line 6 and the soot filter 7 incorporated therein.

What is claimed is:

1. A system for purifying exhaust gas of a diesel engine, comprising
   an exhaust line,
   two branch lines comprising a filter line and a by-pass line, respectively, and arranged downstream of said exhaust line,
   a soot filter incorporated in said filter line,
   a common end line, which is connected to said filter line downstream of said soot filter and to said by-pass line,
   change-over valve means, for connecting said exhaust line in alternation only to said filter line and only to said by-pass line,
   valve-actuating means, for operating said change-over valve means in dependence on the load on said engine so that they connect said exhaust line only to said filter line when said engine is operating under a load in excess of a predetermined load, which is lower than its full load, and so that they connect said exhaust line only to said by-pass line when said engine is operating under a load which is not in excess of said predetermined load,
   an oxidation-inducing catalyst for diesel soot downstream of said change-over valve means and incorporated in one of said by-pass or common end lines, and
   heat-conductive means for interconnecting said soot filter and said oxidation-inducing catalyst.

2. The improvement set forth in claim 1, wherein said oxidation inducing catalyst is incorporated in said common end line.

3. The system set forth in claim 1, wherein said oxidation-inducing catalyst is incorporated in said by-pass line.

4. The system set forth in claim 1, wherein said filter line and said by-pass line are interconnected by said heat-conductive means.

5. The system set forth in claim 1, wherein said by-pass line and said filter line are coaxial and one of them surrounds the other,
   said change-over valve means consist of a rotary valve comprising two cooperating disks,
   each of said disks is formed with at least one first aperture which registers with said filter line and with at least one second aperture which registers with said by-pass line, and
   said two disks are rotatable relative to two relative positions, in which only said first apertures and only said second apertures, respectively, of said disks are in register.

6. The system set forth in claim 5, wherein said soot filter and said oxidation-inducing catalyst are coaxial and one of them surrounds the other.

7. The system set forth in claim 6, wherein said soot filter and said oxidation-inducting catalyst are connected by heat-conductive means.

* * * * *